(12) United States Patent
Elsey et al.

(10) Patent No.: US 7,493,101 B2
(45) Date of Patent: Feb. 17, 2009

(54) TEXT TO SPEECH CONVERSION METHOD

(75) Inventors: Nicholas J. Elsey, West Linn, OR (US); Jonas S. Reyes, Beaverton, OR (US); Corvin F. Swick, White Salmon, WA (US); Christopher A. Huey, Banks, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 148 days.

(21) Appl. No.: 10/946,796

(22) Filed: Sep. 22, 2004

(65) Prior Publication Data

US 2005/0054322 A1 Mar. 10, 2005

Related U.S. Application Data

(62) Division of application No. 09/826,122, filed on Apr. 4, 2001, now Pat. No. 6,801,763.

(51) Int. Cl.
G06F 17/27 (2006.01)
H04M 3/42 (2006.01)
H04Q 7/20 (2006.01)

(52) U.S. Cl. .................................. 455/404.1
(58) Field of Classification Search ................ 704/257, 704/9; 455/404.1, 414.1
See application file for complete search history.

(56) References Cited

U.S. PATENT DOCUMENTS

| | | | |
|---|---|---|---|
| 4,024,508 A | 5/1977 | Bachman et al. | |
| 4,373,116 A | 2/1983 | Shimizu et al. | |
| 4,602,129 A | 7/1986 | Matthews et al. | |
| 4,908,850 A | 3/1990 | Masson et al. | |
| 4,937,570 A | 6/1990 | Matsukawa et al. | |
| 5,187,810 A | 2/1993 | Yoneyama et al. | |
| 5,222,120 A | 6/1993 | McLeod et al. | |
| 5,398,189 A | 3/1995 | Inoue et al. | |
| 5,410,486 A | 4/1995 | Kishi et al. | |
| 5,416,831 A | 5/1995 | Chewning et al. | |
| 5,521,826 A | 5/1996 | Matsumoto | |
| 5,565,874 A | 10/1996 | Rode | |
| 5,737,700 A | 4/1998 | Cox et al. | |
| 5,797,092 A | 8/1998 | Cox et al. | |

(Continued)

FOREIGN PATENT DOCUMENTS

EP 0736853 10/1996

*Primary Examiner*—William D Cumming
(74) *Attorney, Agent, or Firm*—Sofer & Haroun, LLP

(57) ABSTRACT

A user while traveling may call an operator in an information/call center to request directions to a desired destination. In response, the operator obtains a directions file containing the requested directions. To facilitate the user receiving directions in installments in accordance with the invention, the directions file has an indicator associated therewith. The requested directions are read from the directions file to the user by an interactive voice response (IVR) unit via synthesized voice. The indicator is used to indicate in the file which direction is to be read to the user. The user may terminate the call after hearing a desired quantity of directions. When the user subsequently needs another installment of directions, the user may call back the IVR unit which then continues to read directions in the directions file from where the associated indicator indicates. The above process can be repeated, thereby enabling the user to controllably receive the directions in installments.

5 Claims, 6 Drawing Sheets

U.S. PATENT DOCUMENTS

| | | | |
|---|---|---|---|
| 5,806,021 A * | 9/1998 | Chen et al. | .................... 704/9 |
| 5,839,086 A | 11/1998 | Hirano | |
| 5,873,032 A | 2/1999 | Cox et al. | |
| 5,943,417 A | 8/1999 | Cox et al. | |
| 5,950,123 A | 9/1999 | Schwelb et al. | |
| 5,966,437 A | 10/1999 | Cox et al. | |
| 5,995,826 A | 11/1999 | Cox et al. | |
| 6,029,069 A | 2/2000 | Takaki | |
| 6,035,190 A | 3/2000 | Cox et al. | |
| 6,064,874 A | 5/2000 | Cox et al. | |
| 6,107,944 A | 8/2000 | Behr et al. | |
| 6,253,146 B1 | 6/2001 | Hanson et al. | |
| 6,256,515 B1 | 7/2001 | Cox et al. | |
| 6,256,580 B1 | 7/2001 | Meis et al. | |
| 6,347,278 B2 | 2/2002 | Ito | |
| 6,360,164 B1 | 3/2002 | Murayama | |
| 6,389,290 B1 | 5/2002 | Kikinis et al. | |
| 6,396,920 B1 | 5/2002 | Cox et al. | |
| 6,405,131 B1 | 6/2002 | Barton | |
| 6,456,709 B1 | 9/2002 | Cox et al. | |
| 6,466,784 B1 | 10/2002 | Cox et al. | |
| 6,473,612 B1 | 10/2002 | Cox et al. | |
| 6,801,763 B2 * | 10/2004 | Elsey et al. | ............... 455/404.1 |
| 7,013,276 B2 * | 3/2006 | Bickley et al. | ............... 704/255 |
| 7,107,215 B2 * | 9/2006 | Ghali | ........................ 704/257 |
| 2002/0035474 A1 | 3/2002 | Alpdemir | |
| 2002/0196922 A1 | 12/2002 | Marwell et al. | |
| 2003/0007625 A1 | 1/2003 | Pines et al. | |

* cited by examiner

500

··· ADDR_ORGIN=1234+ABC+RD&CITY_ORIGIN=WEST+LINN&
   ⎧―――――505―――――⎫⎧――――515――――⎫

STATE_ORIGIN=OR&ADDR_DESTINATION=8405+NIMBUS+SW&
⎧――525――⎫⎧――――――――535――――――――⎫

CITY_DESTINATION=PORTLAND&STATE_DESTINATION=OR&MDN=5032345678 ···
⎧―――――545―――――⎫⎧――――555――――⎫⎧―――565―――⎫

FIG. 6

| 1160 | BEGINNING OF FILE |
| --- | --- |
| 1168 | 1234 ABC ROAD, WEST LINN, OR |
| 1176 | 8405 NIMBUS SW, PORTLAND, OR |
| 1184 | 19 |
| 1192 | 15.9 MILES |
| 1200 | 25 MINUTES |
| 1208 | DIRECTION OFFSET/ MEMORY ADDRESS | END-OF-DIRECTION MEMORY ADDRESS |

| 1216 | BEGINNING OF DIRECTIONS | |
| --- | --- | --- |
| 1224 | START OUT EAST ON ABC ROAD TOWARD ATHENA ROAD | 0.1 MILE |
| 1232 | TURN RIGHT ONTO ATHENA ROAD AND PROCEED | 0.3 MILE |
| 1240 | TURN RIGHT ONTO ARTEMIS LANE AND PROCEED | 0.2 MILE |

⋮

| 1288 | TAKE I-205 SOUTH RAMP TOWARDS SALEM | 0.2 MILE |
| --- | --- | --- |
| 1296 | MERGE ONTO I-205 SOUTH AND PROCEED | 5.2 MILE |
| 1304 | TAKE I-5 NORTH RAMP TOWARDS TIGARD/TUALATIN | 0.5 MILE |

⋮

| 1360 | TURN LEFT ONTO NIMBUS SW | 0 MILE |
| --- | --- | --- |

FIG. 7

| DTMF 4 "FIRST" | RESET POINTER TO READ FROM FIRST DIRECTION |
| --- | --- |
| DTMF 1 "BACK" | SET POINTER TO READ FROM PREVIOUS DIRECTION |
| DTMF 3 "FORWARD" | SET POINTER TO READ FROM NEXT DIRECTION |
| DTMF 2 "HELP" | PROVIDE DESCRIPTIONS OF NAVIGATION COMMANDS AND CORRESPONDING KEYS |
| DTMF 5 "HOW FAR" | CALCULATE DRIVING DISTANCE FOR REST OF FILE BASED ON CURRENT POSITION OF POINTER |
| DTMF 6 AND DTMF N "GO TO Nth DIRECTION" | SET POINTER TO READ FROM Nth DIRECTION |

FIG. 8

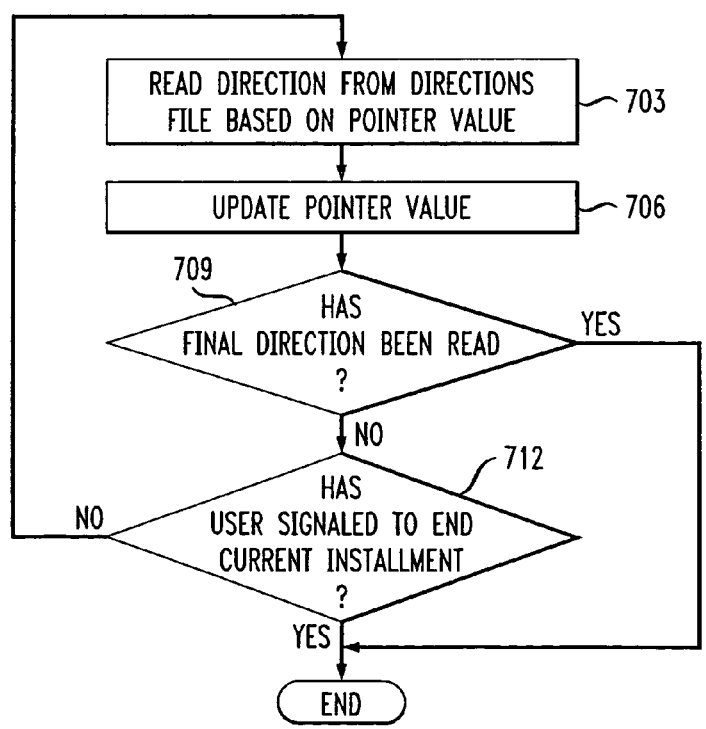

TEXT TO SPEECH CONVERSION METHOD

The present application is a division of U.S. application Ser. No. 09/826,122 filed on Apr. 4, 2001, now U.S. Pat. No. 6,801,763.

FIELD OF THE INVENTION

The invention relates to a system and method for providing a user with directions to a location, e.g., via telephonic communications.

BACKGROUND OF THE INVENTION

It is commonplace that a vehicle driver while driving needs to obtain directions to a desired destination. The driver may utilize a mobile phone to call an operator for such directions. After the driver provides to the operator information concerning his/her whereabouts and desired destination, the operator retrieves from a map server an appropriate route to the destination, and turn-by-turn driving directions thereto. The operator typically provides the directions to the driver over the phone all at the same time.

However, it is inconvenient for a driver while driving to write down the directions provided by the operator, let alone the fact that the driver is normally unequipped to do so. For a relatively short trip, the driver may be able to commit the directions to memory. For a relatively long trip, the driver may need to repeatedly call for operator assistance to refresh his/her memory of the directions. In that case, the driver most likely is connected to a different operator each time and needs to re-convey his/her whereabouts and repeat the desired destination to the operator, thus causing significant inconvenience to the driver.

Accordingly, there exists a need for a technique for effectively providing a user of a communication device with travel directions to his/her desired destination, where the communication device is widely utilized which includes, e.g., a telephone, mobile phone, personal digital assistant (PDA), facsimile device, pager, short message service (SMS) device, etc.

SUMMARY OF THE INVENTION

In accordance with the invention, instructions such as travel directions are provided, to a user of a widely utilized communication device, in installments. By utilizing the communication device, a user receives from a system or an operator travel directions whose amount is controllable by the user. The term "operator" used herein broadly encompasses entities that are capable of providing information assistance in a communication environment, including without limitation human operators, voice response/recognition capabilities, web-enabled operator services, and other electronic access. To that end, travel directions are stored in a file, and an indicator is used which is associated with the file. The travel directions are delivered to the user from the file in a selected order. When the user requests to halt the delivery of the directions as the user may be able to memorize only a limited number of directions at a time, the system or operator responsively stops the delivery, thereby conveying a first installment of directions to the user. The indicator is then used to indicate where the first installment ends in the file. When the user requests a second installment of directions, by relying on the indicator, the system or operator locates in the file the proper beginning direction of the second installment, and delivers the second installment to the user.

In an illustrative embodiment, a user utilizes a communication device, e.g., a mobile phone, to call an operator for travel directions, the operator obtains the directions and causes them to be stored in a data file. To facilitate the user receiving directions in installments, the file has a pointer associated therewith which indicates the memory location in the file from where the directions are being retrieved. The directions are then read by an interactive voice response (IVR) unit to the user in a synthesized voice (or alternatively by the operator verbally). After hearing an installment of directions, the user terminates the phone connection or otherwise signals to end the installment. The pointer then indicates from where in the file the subsequent directions are to be read. When the user calls the IVR unit (or the operator) to request another installment of directions, the IVR unit (or the operator) retrieves the previously created directions file, and reads the directions from that file starting from a direction indicated by the pointer. This process can be repeated until all of the directions in the file are communicated to the user.

Thus, an object of the invention is that a user can utilize a common communication device such as a telephone, mobile phone, PDA, facsimile device, pager, SMS device, etc. to obtain travel directions while he/she is driving, walking, or in other mode of transportation.

In accordance with an aspect of the invention, the user's communication device incorporates capabilities of providing information concerning the location of the device, and thus the user, in obtaining travel directions. For example, the communication device may incorporate a conventional location technique, e.g., a global positioning system ("GPS") technique, for providing the location information in a GPS format. This is particularly advantageous in those circumstances where the user has gotten lost when requesting new or further directions, or where the user for any reason does not follow the order of the directions in the previously created directions file. For example, in the latter case, when the user communicates to the subject system or operator a request for a new installment of directions, the user location information is also communicated. In response, the subject system locates the most relevant direction in the file to the user's location, where the most relevant direction may or may not immediately follow the previous installment in the file. A direction is said to be the most relevant if, of all of the directions in the file, that direction covers a location point which is closest to the user's location. If the distance between the user's location and the closest location point does not exceed a predetermined distance, the subject system or operator delivers the installment starting from the most relevant direction. Otherwise, if such a distance exceeds the predetermined distance, the user necessarily has deviated significantly from the planned route and is thus assumed lost. In that case, the subject system or operator may warn the user of the significant deviation and suggest that the user retrace his/her path back to the planned route. The system or operator thereafter delivers to the user an installment starting from the last read direction, instead, to help refresh the user's memory of some of the roads that the user may have traveled before his/her "lost" state. As an alternative, the subject system or operator may formulate another route to help the user to return to the planned route. In either event, as soon as the user is back on the planned route, upon request by the user for an installment of directions, the system or operator delivers an installment starting from the most relevant direction as described before.

As a second alternative, the system or operator may reformulate a route from the location where the user is declared lost to the same destination as the original planned route as if the user started a new trip from the lost location. The information concerning the new route may then be delivered to the user in the manner described before.

BRIEF DESCRIPTION OF THE DRAWING

Further objects, features and advantages of the invention will become apparent from the following detailed description taken in conjunction with the accompanying drawing showing an illustrative embodiment of the invention, in which:

FIG. 6 is a memory map of a copy of a directions file in the IVR unit of FIG. 3;

FIG. 7 tabulates different navigation commands and their corresponding functions;

FIG. 8 is a flow chart depicting a routine for reading directions from the directions file in accordance with the invention.

DETAILED DESCRIPTION

The invention is directed to a technique for effectively providing directions to a user utilizing a popular communication device, e.g., a telephone, mobile phone, personal digital assistant (PDA), facsimile receiver, pager, short message service (SMS) device, etc. Thus, an object of the invention is to save costs by use of the popular communication device to receive directions, with no additional special equipment required. Further, with the invention, the user can conveniently obtain directions using the communication device anywhere, limited only by the communication coverage.

Figure 1:
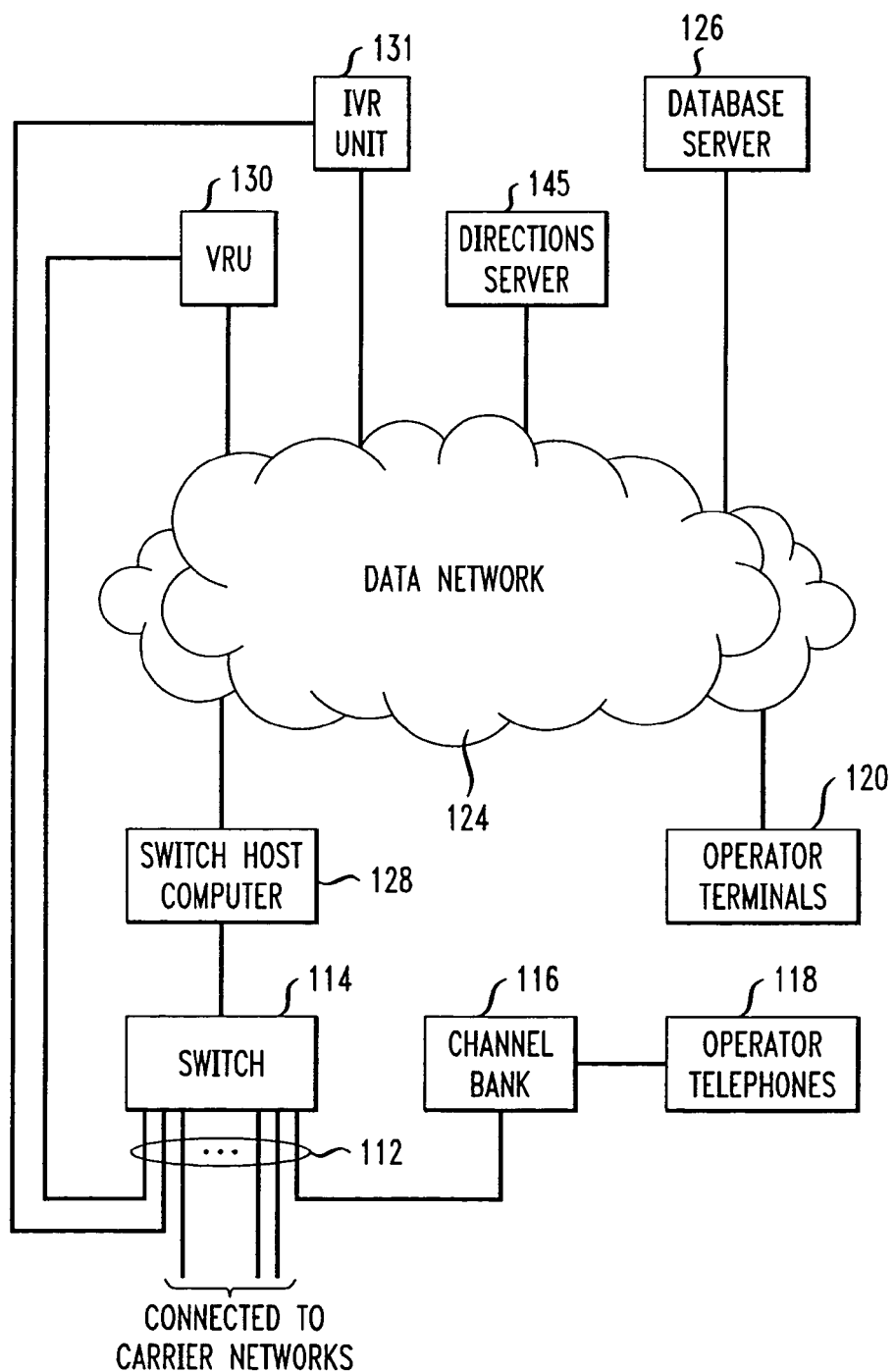
FIG. 1 is a block diagram of an information/call center in accordance with the invention.

In accordance with the invention, the user utilizes a communication device to obtain directions from a computerized system in installments or piecemeal under his/her control. By way of example, such a computerized system may be located in an information/call center. FIG. 1 illustrates one such information/call center 100 embodying he principles of the invention. In this illustrative embodiment, a user utilizes a mobile phone to call an information assistance operator in center 100 to request directions to a desired destination. Again, the term "operator" used herein broadly encompasses entities that are capable of providing information assistance in a communication environment, including without limitation human operators, voice response/recognition capabilities, web-enabled operator services, and other electronic access. The operator obtains the requested directions and causes them to be stored in a directions file. In this instance, such a file is identified by the user's mobile phone number (also known as mobile directory number (MDN)) and/or other identifier. To facilitate the user receiving directions in installments, a pointer associated with the directions file is used to keep track of the directions which have been retrieved from the file and sent to the user. The size of each installment of directions is controllable by the user. In providing the directions, the operator may connect the user to interactive voice response (IVR) unit 131 described below. IVR unit 131 reads to the user the directions from the file in a synthesized voice until the user signals to end the current installment, e.g., by disconnecting the call, or until the end of the directions file is reached, whichever occurs earlier. Other signals which may be used by the user to indicate the end of the current installment includes, e.g., a designated code or tones occasioned by pressing one or more keys on a key pad. After the current installment is delivered to the user, the pointer advances to indicate the location in the directions file from which the next installment is to begin. Thus, for example, after the traveling user consumes the directions in the current installment, the user may call back for the next installment whenever he/she is ready. After the user in the call-back indicates his/her intent to retrieve additional directions for the previously planned route, IVR unit 131 accesses the previously created directions file. IVR unit 131 then continues to deliver the remaining directions from a file location indicated by the pointer until, again, the user signals to end the current installment or until the end of the directions file is reached, whichever occurs earlier. The user may repeat the above process to retrieve additional installments of directions for the same route. Moreover, by relying on the pointer to indicate the file location from which the directions are retrieved, IVR unit 131 is capable of providing such cassette tape player functions as fast forwarding, rewinding, etc. in delivering the directions, thereby enabling the user to further control the direction delivery.

As shown in FIG. 1, information/call center 100 includes switch 114 having T1 spans 112 for connection to voice response unit (VRU) 130, channel bank 116 and carrier networks. Channel bank 116 is used to couple multiple operator telephones 118 to switch 114. The operators in call center 100 are further equipped with operator terminals 120, each of which includes a video display unit and a keyboard with associated dialing pad. Operator terminals 120 are connected over data network 124 to database server 126. Switch host computer 128, VRU 130, IVR unit 131 and directions server 145 are also connected to data network 124. By way of example, data network 124 includes a local area network (LAN) supplemented by a number of point-to-point data links.

Center 100 may receive an incoming information assistance call from one of the carrier networks through a carrier switching center therein. It also places outgoing calls through one of the carrier networks which may be different than that used for the incoming call.

Switch 114 is conventional which includes digital signal processing circuitry providing the requisite conference capability, and DTMF and multi frequency (MF) tone generation/detection capabilities. In this illustrative embodiment, switch 114 supports digital T1 connectivity. The operation of switch 114 is governed by instructions stored in switch host computer 128.

Each incoming information assistance call from a user is received by switch 114 in center 100 which connects it to an available operator's telephone. If no operator is available when a call is received, the call is queued in a conventional manner until an operator becomes available. The queuing and call distribution in this instance is in accordance with a standard Automatic Call Distribution (ACD) algorithm. Operators may utilize database server 126 to provide information assistance including searching for a user's desired party and determining the appropriate destination number of the party.

VRU 130 is used to play the constant repeated parts of an operator's speech, namely, the various greetings and signoffs (or closings). VRU 130 is connected via data network 124 to switch host computer 128 and via one or more T1 spans to switch 114. At appropriate stages in a call progression, switch host computer 128 initiates a voice path connection between VRU 130 and switch 114 such that the user, or the user and the operator, are able to hear whatever pre-recorded speech is played on that connection by VRU 130. Computer 128 then instructs VRU 130, via data network 124, what type of message to play, and passes data parameters that enable VRU 130 to locate the message appropriate to the call state.

Figure 2:
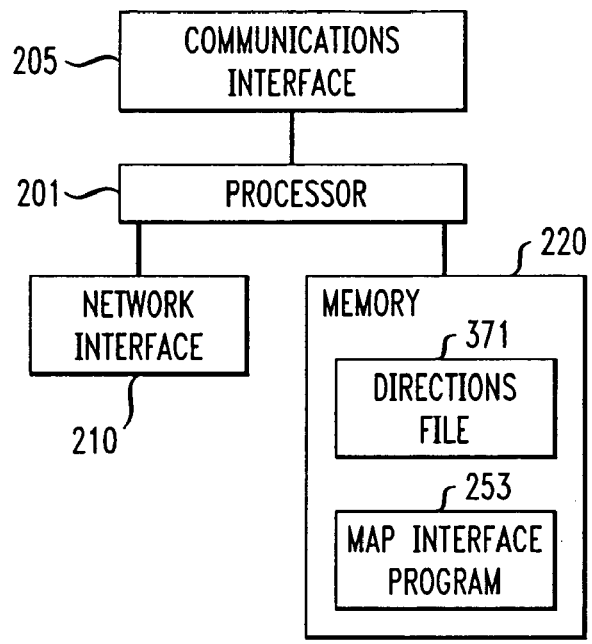
FIG. 2 is a block diagram of a directions server in the information/call center for obtaining travel directions from a remote map server.

FIG. 2 illustrates directions server 145, which is connected to data network 124 through network interface 210. A daemon process, part of map interface program 253, runs on directions server 145. As is conventional, the daemon process is an agent program which continuously operates on server 145 as a background process and performs system-wide functions. In this instance, these functions include communicating with a remote map server at a predetermined uniform resource locator (URL) through communications interface 205. This map server is capable of providing maps and directions from a given origination point to a given destination point. For example, instructed by the daemon process, processor 201 elicits from an operator information, e.g., on the origination and destination addresses provided by the user for which the directions are sought. Processor 201 then arranges the provided information in an appropriate format for transmission to the map server via the Internet (or a dedicated network link). After learning the origination and destination addresses, the map server returns a directions file providing, among others, directions from the origination address to the destination address. Such a directions file, denoted 371, is stored in memory 220.

In an alternative embodiment, all necessary functionality and data by the remote map server are incorporated into directions server 145, thereby obviating the need of remote access to such functionality and data.

Figure 3:
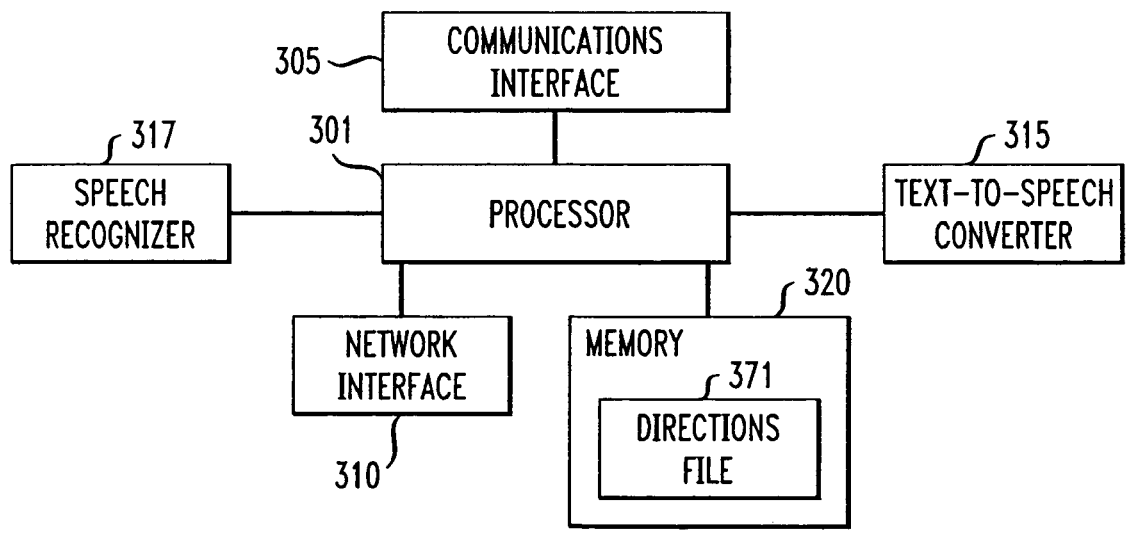
FIG. 3 is a block diagram of an interactive voice response (IVR) unit for delivering directions to a user in accordance with the invention.

FIG. 3 illustrates IVR unit 131 which, as mentioned before, is used to interact with the user and read to the user the directions from a directions file, e.g., directions file 371. As such, a copy of file 371 is provided to unit 131 and temporarily stored in memory 320. IVR unit 131 also includes text-to-speech converter 315 for converting textual directions in directions file 371 to the corresponding synthesized voice version. To that end, converter 315 parses file 371 and strips it of non-textual, non-directional or other irrelevant information therein such as graphics and advertisement information also provided by the map server. In addition, converter 315 preprocesses file 371 to remove from the textual directions punctuation and special characters which serve no phonetic purposes.

We have recognized that a conventional text-to-speech converter is not particularly feasible for delivering the directions here because of the peculiar language usage and local speech in verbalizing certain direction terms. Converter 315 is modified from one such conventional converter by incorporating thereinto context rules to adapt its output to common usage and local speech. In accordance with such rules, converter 315 looks for and replaces in directions file 371 selected direction terms, although textually correct in grammar and spelling, with words which are more "phonetically understandable," resulting in a speech more readily understood by the human ear. For example, in the United States when given a three digit highway number where the 10's digit is a zero, e.g., Highway 205, one typically pronounces the highway number as "two oh five," rather than "two hundred and five" as a conventional text-to-speech converter would pronounce without regard for the fact that it is a highway number. In addition, where the 10's digit of a three digit highway number is not a zero, e.g., Highway 217, one typically pronounces the highway number as "two seventeen," rather than "two hundred and seventeen" as a conventional converter would pronounce. Thus, in accordance with an aspect of the invention, converter 315 also preprocesses the text from directions file 317 to, among others, look for specific words which indicate a road and which are normally followed and identified by a number such as "highway," "freeway," "parkway," "route," and their abbreviations "hwy," "pkwy," "rte," etc., as indicated at step 405 in FIG. 4. At step 408, converter 315 determines whether one such specific word is followed by a three digit number. If not, the subject routine comes to an end. Otherwise, converter 315 at step 411 determines whether the middle digit is a zero. If so, converter 315 changes the middle digit to the word "oh," as indicated at step 414. Otherwise, converter 315 inserts a <space> before the middle digit to separate the hundred's digit from the ten's and unit digits, as indicated at step 417.

In addition, converter 315 also screens for certain word patterns from directions file 317 and modify them to make them more phonetically understandable. For example, the word pattern "2a" as in route 2a, exit 2a and apartment 2a is replaced by "2<space> eh," and the word "Oregon" is replaced by "Oregun." In addition, the abbreviations such as "hwy," "pkwy," and "rte" are replaced by their non-abbreviated versions such as "highway," "parkway" and "route," respectively. These word patterns, together with their replacements, are stored in a look-up table in converter 315. Such a table is developed through experience, usage and local knowledge, and thus may vary from one information/call center to another depending on the actual local region served thereby.

The user may interact with IVR unit 131 by communicating certain commands thereto, e.g., by pressing selected keys on the keypad. In addition, with speech recognizer 317, IVR unit 131 in this instance is receptive to the user commands via voice. Recognizer 317 affords continuous voice recognition with an optional cut-through feature so that a user can utter a command while the directions are being read by IVR unit 131. IVR unit 131 would then recognize the command, interrupt the text being read, and perform the appropriate function according to the command. In case of a noisy environment, the cut-through feature may be disabled to avoid false detection of a command.

By way of example, let's say a user while driving uses a mobile phone to call an information assistance operator, requesting the phone number and address of, and directions to, a desired restaurant, e.g., the Rosa Restaurant in Portland, Oreg. In this example, the call is routed to information/call center 100 where an operator at an operator terminal 120 performs the requested search. Utilizing database server 126, the operator locates the restaurant at 8405 Nimbus SW, Portland, Oreg., and the phone number thereof. The restaurant's phone number and address are displayed on terminal 120 and then provided to the user in a conventional manner. In this instance, the operator also invokes the aforementioned daemon process in directions server 145, which prompts for an origination and a destination for which the directions are sought. In response, the operator inputs the restaurant address at the destination prompt by transferring the already displayed restaurant address to the prompt, thereby obviating the need of transcribing it. The user also communicates to the operator that he/she is currently located at 1234 ABC Road, West Linn, Oreg. Accordingly, the operator inputs the received address at the origination prompt.

Figures 4, 5:
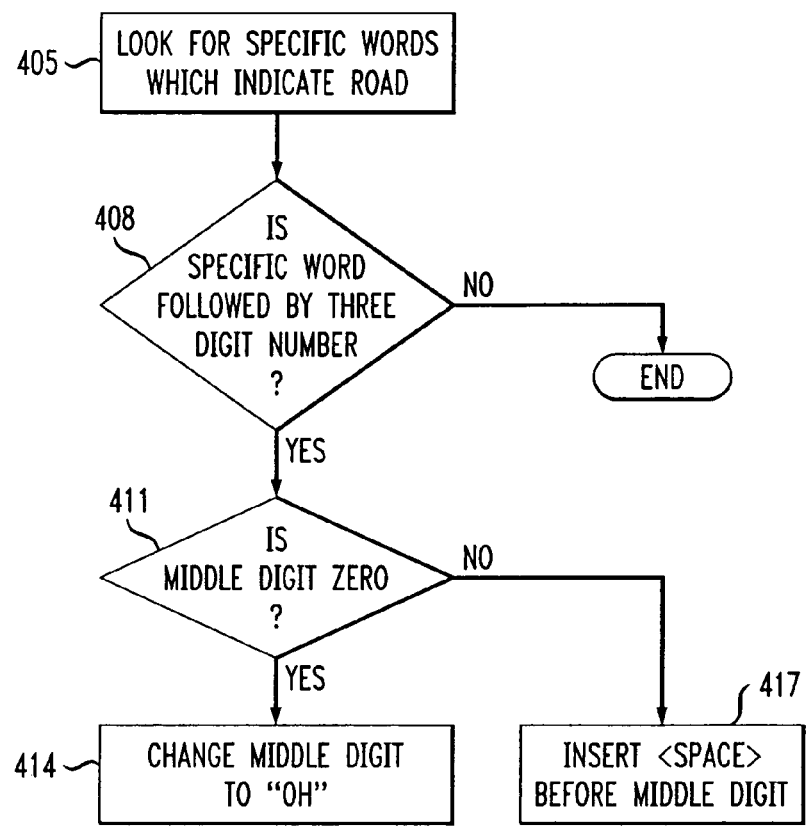
FIG. 4 is a flow chart depicting a routine for delivering certain direction terms using the IVR unit of FIG. 3.
FIG. 5 illustrates a request for travel directions sent by the directions server of FIG. 2.

Once the origination and destination addresses are entered, processor 201 formulates a directions request and transmits same to the aforementioned map server over the Internet. FIG. 5 illustrates one such request (denoted 500) wherein the origination data is populated among ADDR_ORIGIN field 505, CITY_ORIGIN field 515, and STATE_ORIGIN field 525; and the destination data is populated among ADDR_DESTINATION field 535, CITY_DESTINATION field 545, and STATE_DESTINATION field 555. In addition, MDN field 565 contains the user's MDN which may be used to identify the directions file returned by the map server.

Request 500 is then communicated to the map server over the Internet through communications interface 205. In response to request 500, the map server devises a route connecting the origination address to the destination address, and the directions for realizing that route. The map server then formats the directions in a file and transmits the resulting directions file, say, file 371 to directions server 145, along with the user's MDN. Instructed by map interface program 253, processor 201 assigns to file 371 a file name which may take the form nnnnnnnnnnn.<route_id>, where nnnnnnnnnn represents the digits of the user's MDN, and <route_id> represents a file extension for further identifying the requested route in case the same mobile phone user requests more than one route. Processor 201 causes file 371 to be opened on terminal 120, enabling the operator to view the directions for the requested route, along with the assigned name of file 371. The operator may briefly check the directions to see whether they correspond to the given origination and destination addresses. After the addresses are verified, the operator provides the telephone number for accessing IVR unit 131 and <route_id > file extension of file 371 to the user for his/her later retrieval of directions directly from IVR unit 131, in accordance with the invention. A copy of file 371 is thereafter transmitted to IVR unit 131. Processor 301 in unit 131 processes the received file, places it in memory 320, and operates text-to-speech converter 315 to process file 371 in the manner described before and read from file 371 the requested directions and information, in a synthesized voice, to the user over the established phone connection. However, it should be noted that instead of having IVR unit 131 deliver such directions and information, the user can always call and request an operator to communicate same to him/her verbally.

FIG. 6 illustrates a memory map of directions file 371 in memory 320. As shown in FIG. 6, file 371 starts with a "Beginning of File" indicator which in this instance is stored at memory address 1160. It should noted that the term "memory address" here refers to an address where an item is located in memory 320. On the other hand, an "offset address" refers to an address internal to file 371. For example, in this instance, the first item in file 371 consisting of the Beginning of File indicator has an offset address 0000 with respect to file 371, which however corresponds to the memory address 1160 with respect to memory 320. Thus, in this example, the difference between the offset address and the corresponding memory address is 1160. This being so, by knowing one of the offset address and memory address of an item, the other address can be readily determined based on their difference.

The Beginning of File indicator may include the name of file 371, e.g., "5032345678.A1" in this instance where "5032345678" is the user's MDN, and "A1" is the assigned <route_id> file extension. This file name, and the memory address of the Beginning of File indicator, i.e., 1160, are stored by processor 301 in a look-up table which associates the file name with the memory address.

Continuing the above example, data concerning the origination point of the subject route, i.e., 1234 ABC Road, West Linn, Oreg., is stored at memory address 1168 (or offset address 0008). Data concerning the destination point of the subject route, i.e., 8405 Nimbus SW, Portland, Oreg., is stored at memory address 1176 (or offset address 0016). Data concerning the total number of directions for the subject route, e.g., 19 in this instance, is stored at memory address 1184 (or offset address 0024). Data concerning the total distance of the subject route, e.g., 15.9 miles in this instance, is stored at memory address 1192 (or offset address 0032). Data concerning the estimated driving time, e.g., 25 minutes in this instance, is stored at memory address 1200 (or offset address 0040). Pointer 873 to be described is located at memory address 1208 (or offset address 0048). It should be noted that the offset addresses allocated for the origination point, destination point, number of directions, total distance of the route, estimated driving time and pointer 873 in a directions file are predetermined, thereby allowing processor 301 to readily locate and retrieve such data.

In addition, a "Beginning of Directions" indicator is stored at memory address 1216, followed by addressable directions. For example, at memory address 1224, the first direction includes directive 805, and mileage information 810 which pertains to directive 805. Thus, as processor 301 parses the directive 805 and mileage information 810 at memory address 1224, it causes text-to-speech converter 315 to read in a synthesized voice the first direction, e.g., "Start out going east on ABC Road towards Athena Road for 0.1 mile." Similarly, the directive and mileage information comprising the second direction is stored at memory address 1232; the directive and mileage information comprising the third direction is stored at memory address 1240; and so on. The directive and mileage information comprising the final direction is stored at memory address 1360.

Pointer 873 includes direction offset/memory address field 875 and end-of-directions memory address field 877. Field 875 is used to store the offset address of the direction that was last read to the user. Thus, in computer programming parlance, pointer 873 is said to "point" at the last read direction in file 371. The offset address in field 875 is initially set to "0000." Field 877 is used to store the memory address of the final direction. After file 371 is placed in memory 320, processor 301 locates the Beginning of Directions indicator and the final direction therein, and identifies their respective memory addresses, i.e., 1216 and 1360 in this instance. The Processor 301 then adds the memory address of the Beginning of Directions indicator, i.e., 1216, to the offset address in field 875 to obtain the memory address of the last read direction. This memory address is temporarily stored in field 875. Processor 301 also stores the memory address of the final direction, i.e., 1360, in field 877. While text-to-speech converter 315 is reading the directions to the user, the value of field 875 changes continually to keep track of the memory address of the last read direction.

As the directions are being read to the user, the user may issue navigation commands to navigate through directions file 371. Examples of the navigation commands are tabulated in FIG. 7. Each navigation command may be invoked by a corresponding DTMF tone generated by pressing a corresponding numeric key on a telephone keypad, or by uttering the command recognizable by speech recognizer 317. For example, an invocation of a "First" command, corresponding to a "DTMF 4" key, resets pointer 873 to point at the Beginning of Directions indicator. That is, the value of field 875 of pointer 873 is overwritten with the memory address of the Beginning of Directions indicator. Processor 301 then causes text-to-speech converter 315 to re-read from the first direction based on the new memory address in field 875. Similarly, an invocation of a "Back" command, corresponding to a "DTMF 1" key, results in a change in the value of field 875 of pointer 873 to cause converter 315 to read from the previous direction. An invocation of a "Forward" command, corresponding to a "DTMF 3" key, results in a change in the value of field 875 of pointer 873 to cause converter 315 to read from the next direction. An invocation of a "Help" command, corresponding to a "DTMF 2" key, results in a listing of available commands and the keys and functions corresponding thereto. An invocation of a "How far" command, corresponding to a "DTMF 5" key, results in informing the user of the distance for the rest of the route from the point where the last direction is completed, and the memory address of such last direction is indicated in field 875 of pointer 873. Processor 301 determines the distance in question by adding the mileages associated with the remaining directions. An invocation of "Go to Direction N" command, corresponding to a "DTMF 6" key followed by a "DTMF N" key, results in a change in the value of field 875 of pointer 873 to cause converter 315 to read from the Nth direction. Other commands and corresponding keys may be directed to reading of other data in file 371, e.g., the origination point, destination point, number of directions, total distance of the route, estimated driving time, etc.

Refer now to FIG. 8 which depicts a direction reading routine, whereby converter 315 reads a direction from directions file 371 based on the direction memory address value of field 875 in pointer 873, as indicated at step 703. Processor 301 at step 706 updates pointer 873 and in particular the value of field 875 to indicate the memory address of the last read direction. Processor 301 at step 709 determines whether the final direction in file 371 has been read. To that end, processor determines whether the value in field 875 equals that in field 877 of pointer 873. As mentioned before, field 877 contains the memory address of the final direction. If it is determined that the final direction has been read, i.e., the value of field 875= the value of field 877, the subject routine comes to an end. Otherwise, if the final direction has not been read, i.e., the value of field 875< the value of field 877, the subject routine proceeds to step 712 where processor 301 determines whether the user has signaled to end the current installment of directions, e.g., by hanging up the call, thus generating a disconnection supervisory signal. Alternatively, the user may signal to end the current installment by pressing a predetermined key(s) on the keypad. If it is determined that the user has not hung up the call, the subject routine returns to step 703 described before. Otherwise, the subject routine again comes to an end. In addition, processor 301 converts the memory address of the last read direction in field 875 to the corresponding offset address. This offset address is communicated to directions server 145 and is stored in the corresponding field 875 of the original file 371 in memory 220. The file 371 in memory 320, which is a copy, may be deleted later on.

Continuing the above example, let's say after hearing a first installment consisting of the first three directions, the user hangs up and manages to follows those directions. The user then needs a second installment of directions. In accordance with the invention, the user can call IVR unit 131 directly for subsequent installments using the IVR unit access phone number previously provided to him/her by the operator. When the user calls the access phone number, communications interface 305 in IVR unit 131 picks up the call. Processor 301 obtains from interface 305 an automatic number identifier (ANI) (also known as a caller ID) of the call, which is the user's MDN in this instance. Based on the user's MDN, processor 301 identifies from the aforementioned look-up table any directions file having the nnnnnnnnnn portion of the file name matches the user's MDN. If there is only one such file, processor 301 automatically requests the directions file from directions server 145. If there is more than one as the user may have requested directions for different routes, processor 301 queries the user for the <route_id> file extension of the desired file previously provided to him/her by the operator. Alternatively, processor 301 causes recitations of all possible <route_id> file extensions one by one to refresh the user's memory. If the user cannot recall the <route_id> file extension, processor 301 compiles a list of the directions files pertaining to the user, arranged chronologically with the first file in the list from which directions are most recently read to the user. The user can select the desired file by pressing a designated key on the telephone keypad, or by saying "Select this file." Otherwise, the user can say "No," or press another designated key on the keypad to signal processor 301 to skip to the next file.

Once the desired directions file is identified, say, file 371, processor 301 requests a copy of the file from directions server 145. Since the third direction was last read to the user in this instance, field 385 of pointer 383 in file 371 currently contains the offset address of the third direction, i.e., 0080. After converting such an offset address in field 385 to the corresponding memory address in the manner described before, based on this memory address, processor 301 causes converter 315 to read the second installment starting from the next, fourth direction, in accordance with the direction reading routine of FIG. 8. The above-described process similarly follows for obtaining subsequent installments of directions.

In accordance with another aspect of the invention, the service of providing directions to a user can be enhanced with the knowledge of the user's geographic location at the time the user requests the service. To that end, a global positioning system (GPS) receiver may be incorporated in the users communication device, e.g., mobile phone in this instance. Other well known mobile handset location techniques may be incorporated, instead, which include, e.g., a wireless network based triangulation technique. In a conventional manner, the GPS receiver receives signals from a constellation of GPS satellites, and based on the received signals determines the geographic coordinates (e.g., longitude and latitude) of the current location of the user's mobile phone, and thus the user. When the user utilizes the mobile phone incorporating the GPS device to call an operator in information/call center 100 or IVR unit 131, GPS information concerning the location of the user is automatically communicated thereto, along with other call set-up signals such as an ANI. In this illustrative embodiment, the GPS coordinates of all location points covered by each direction, including the start point and end point thereof, are also provided in the directions file. It should be noted that the end point of each direction is the same as the start point of the next direction. After accessing the appropriate directions file in a manner described before, processor 301 in IVR unit 131 identifies the most relevant direction in the directions file to the received user's location. A direction is said to be the most relevant if, of all of the directions in the file, that direction covers a location point closest to the user's location. For example, processor 301 may identify the most relevant direction having an end point closest to the user's location, and causes converter 315 to start reading from that direction.

By way of example, let's say the user has listened to a first installment of directions to the Rosa Restaurant in file 371 described before. The last direction read to the user by IVR unit 131 is the third direction, i.e., "Turn right onto Artemis Lane and proceed for 0.2 mile." Thus, field 875 of pointer 873 at this point contains the memory address of the third direction, i.e., 1240. Let's further assume that the user had a prior experience driving to the Rosa Restaurant via a similar route, and after following the first installment of directions, the user partly recalls the route to the restaurant. Thus, the user proceeds without calling IVR unit 131 for the remaining directions. However, after getting on highway I-205 South, the user is no longer sure about the route. The user then calls the IVR unit 131 via his/her mobile phone, incorporating the aforementioned GPS receiver therein which provides the GPS coordinates of the phone, and thus the user. After interface 305 receives the call which includes information concerning the ANI and the user's GPS coordinates, processor 301 accesses the appropriate directions file, say, directions file 371, in a manner described before. Processor 301 compares the GPS coordinates of the user with those of the end point of each direction in file 371, thereby identifying a particular end point which is closest to the user's location. Processor 301 further identifies the direction having that particular end point, and causes converter 315 to start reading from the identified direction. Processor 301 then adjusts the value of field 875 of pointer 873 to the memory address of the identified direction. In this example, processor 301 determines that the user is closest to the end point of the eleventh direction "Take I-5 North ramp towards Tigard/Tualatin for 0.5 mile." Thus, processor 301 causes converter 315 to read the eleventh direction, and accordingly changes the value of field 875 to the memory address of the eleventh direction, i.e., 1304 in this instance.

Converter 315 continues to read the remaining directions to the user, in accordance with the direction reading routine of FIG. 8. It should be noted that even if the user does not immediately relate to the initial direction read to the user (i.e., the eleventh direction in this instance), which may be one or more directions too advance, the user can always invoke the aforementioned Back navigation command to adjust to the correct starting direction. Thus, with the knowledge of the user's current location, IVR unit 131 can efficiently provide to the user the directions relevant to the user location, i.e., starting from the eleventh direction, as opposed to the directions immediately following the last installment, i.e., starting from the fourth direction.

The knowledge of the user location is important especially when the user significantly deviates from the planned route and is assumed lost, or when the user realizes that he/she has gotten lost. In either case, when the user calls IVR unit 131 for a new installment of directions, processor 301 compares the GPS coordinates of the user with those of the location points of each direction in file 371, and determines that the user deviates from the closest location point by more than a predetermined distance. Processor 301 may then warn the user of the significant deviation and suggest that the user retrace his/her path back to the planned route. Processor 301 may thereafter deliver to the user an installment starting from the last read direction to help refresh the user's memory of some of the roads that the user may have traveled before his/her "lost" state. As an alternative, processor 301 may transmit the GPS coordinates of the user and those of the closest location point in the planned route to directions server 145 via the daemon process, and request same to formulate another route to help the user to return from his/her lost location to the planned route. In either event, as soon as the user is back on the planned route, upon request by the user for an installment of directions, processor 301 delivers an installment starting from the most relevant direction as described before.

As a second alternative, a new route may be formulated from the lost user location to the same destination as the original planned route as if the user started a new trip from such a location. In that case, for example, when the user calls an operator and declares that he/she has gotten lost, the user's GPS coordinates from the call can be directly imported to directions server 145 as the origination point, provided that the map server is GPS based. Otherwise, a translation of the GPS coordinates to the actual address needs to be performed. The destination point may be imported from file 371 if it can be readily identified by the user. Otherwise, the user may provide the destination address again. The whole process is performed as if the user were planning a new route. The resulting route is then read to the user by IVR unit 131 in the manner described before.

The invention may be implemented with various communication and information services. For example, the invention may be implemented using a "StarBack" feature in a directory assistance service. To fully appreciate the StarBack feature, let's assume a user calls an operator in an information/call center (e.g., center 100) for directory assistance, e.g., requesting a desired destination number and a transfer to that number. As mentioned before, when the user calls an operator in center 100, the user's call is connected to switch 114 therein. It should be noted that such a connection to switch 114 is intact even after the call is transferred to the destination number as long as the user does not hang up. A DTMF receiver is allocated in switch 114 to monitor for a predetermined signal from the user connection for the entire duration of the call in case the user may require further operator assistance. By way of example, the predetermined signal is a DTMF signal generated by pressing a "*" (star) key on the phone. Thus, the "StarBack" feature enables a user, who called for operator assistance, to re-summon an operator by pressing a "*" key as long as the user never hangs up. When the DTMF receiver detects the "*" key signal, the re-summoning of an operator appears as a fresh call to the ACD logic. This in turn results in the user being connected to an available operator. Note that the operator to whom the call is connected is allocated according to the ACD logic, and may or may not be the operator that previously handled the user's call. The StarBack feature can be repeatedly invoked in a call connected through switch 114 before the user hangs up.

Thus, by taking advantage of the StarBack feature, the user can obtain directions in installments in accordance with the invention. For example, after the user calls an operator in information/call center 100, and receives a first installment of directions from the operator, he/she can summon further installments as needed along the route simply by pressing the "*" key. (Although in this example the directions are read by an operator, it is apparent from the disclosure heretofore that IVR unit 131 can readily take the place of an operator to read the directions.) In such an implementation, the user's connection to information/call center 100, and in particular switch 114 therein, is maintained during the course of the trip. However, the operator can attend to other users while the traveling user does not need the operator's immediate attention. Similar to directions file 371, a file, e.g., in hypertext markup language (HTML), from which the directions are read by the operator to the user has a pointer associated therewith, which is used to indicate the last read direction within that file. This HTML file is cached after the operator delivers to the user the requested installment so that the file can be promptly retrieved and opened upon detection of a StarBack signal. Since "StarBack" may return the user to a second, different operator, this second operator at terminal 120 may enter a "last route" command to pick up where the last operator left off. In response, the HTML file is retrieved and opened on terminal 120 and the last read direction therein is automatically marked by the associated pointer. The second operator then delivers a second installment starting from the next direction in the file. While driving between operator directions, the user is simply kept in a "hold" state. Of course, instead of utilizing the StarBack feature to keep the current call on hold, the user can repeatedly call an operator anew, e.g., using the "last number dialed" feature on the phone, to achieve the same result.

The foregoing merely illustrates the principles of the invention. It will thus be appreciated that those skilled in the art will be able to devise numerous other arrangements which embody the principles of the invention and are thus within its spirit and scope.

Figure 9:
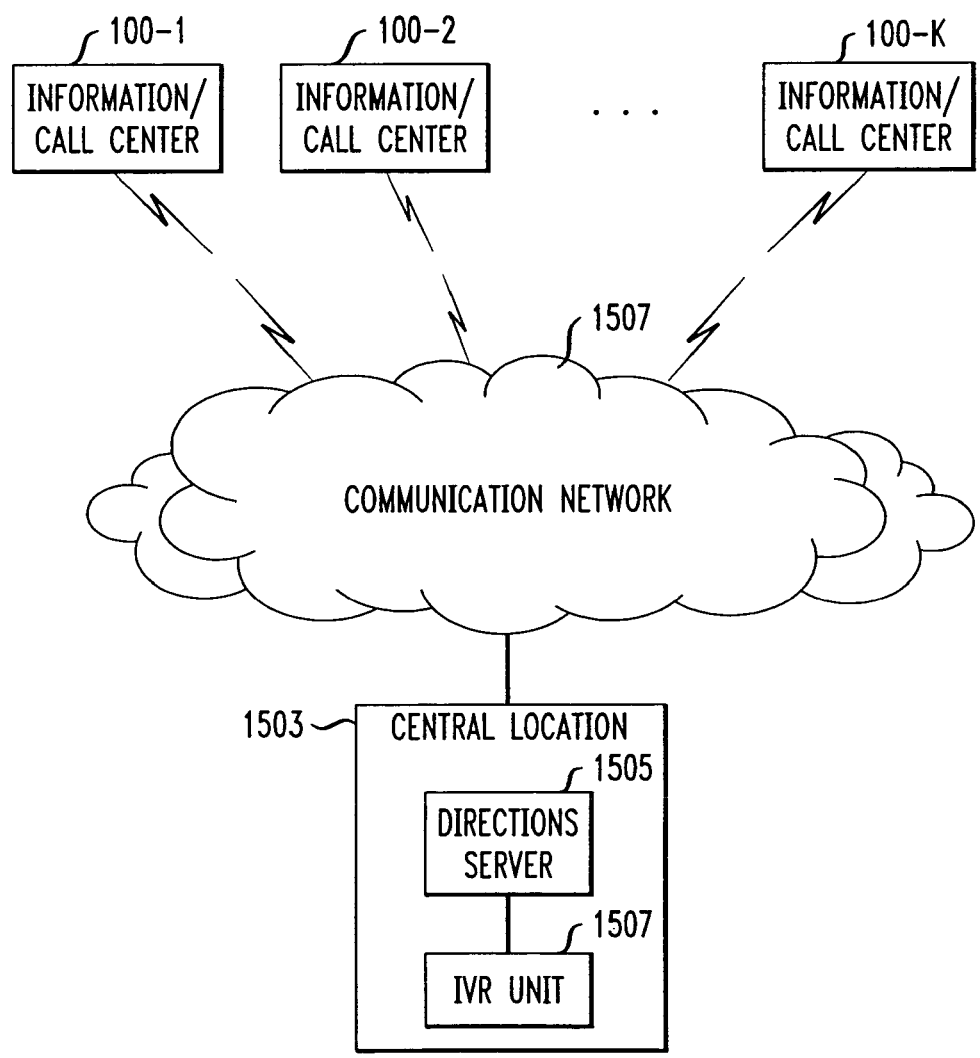
FIG. 9 illustrates an arrangement where a number of information/call centers communicate with a directions server in a central location.

For example, in the disclosed embodiment, IVR unit 131 is located in information/call center 100. However, the invention may also be implemented in a different arrangement. One such arrangement is illustrated in FIG. 9 where information/call centers 100-1, 100-2, . . . 100-K, which are similar to information/call center 100 sans directions server 145 and IVR unit 131, share use of directions server 1505 and IVR unit 1507 in central location 1503, where K represents an integer greater than one. In this arrangement, centers 100-1 through 100-K may communicate with directions server 1505 through communication network 1507, e.g., a wide area network (WAN). Similar to server 145, server 1505 requests directions from the remote map server. Upon receiving the requested directions, similar to IVR unit 131, IVR unit 1507 delivers them to users, e.g., in installments. However, for example, because directions server 1505 needs to serve more than one information/call center, it requires more capacity than directions server 145. For example, directions server 1505 requires larger memory storage for storing directions files sent thereto from different centers. To efficiently utilize such storage, each directions file may be deleted after a limited period from the user's accessing the file, unless the user re-accesses the file within that limited period.

In addition, it will be appreciated that each direction in file 371 my include an estimated driving time in completing the direction. In that case, when the user calls IVR unit 131 back to continue with a new installment of directions, the beginning direction of the new installment is determined based on the elapsed time from the end of his/her last call. This elapsed time is used by IVR unit 131 to move the appropriate number of directions ahead in the directions file. To help compute the elapsed time, for example, pointer 873 may incorporate an additional field to register the time when the user's last call ends.

Moreover, in the disclosed embodiment, pointer 873 illustratively includes the memory (or offset) address of the direction in file 371 last read to the user, thereby pointing at the last read direction and thereby indicating which direction in the file is to be read next. However, it is well understood by a person skilled in the art that pointer 873 may easily include, instead, the memory (or offset) address of the direction in file 371 to be read next, thereby pointing at the direction to be read and thereby indicating which direction was last read.

Further, as mentioned before, directions server 145 may obtain from the map server more than the directions requested by a user. In another embodiment, server 145 also obtains map information concerning a planned route. Thus, for example, when an operator at terminal 120 opens a directions file which includes map information, the requested directions for the planned route are shown on terminal 120, with an indicator indicating the last read direction. Also shown on terminal 120 is a graphical map delineating the planned route thereon, with an indicator indicating on the map the location point corresponding to the last read direction. Thus, with such a graphical map, the operator can advise the user of the planned route, and the next installment of directions more effectively.

Still further, in the disclosed embodiment, IVR unit 131 is used to deliver directions to the user in a synthesized voice. However, other methods of delivery may also be used. For example, IVR unit 131 may be programmed to call a voice mail system, designated by the user, through communications interface 305. In that case, a voice message including the requested directions is left by IVR unit 131 on the system for the user's later retrieval. Moreover, the directions in directions file 371 may be communicated to the user in textual form. In that case, a facsimile server may be used in center 100 to facsimile-transmit the directions in file 371 to a facsimile receiver associated with the user; an e-mail server in center 100 may be used to send the directions in file 371 to an e-mail account designated by or assigned for the user; and a short message server may be used in center 100 to transmit the directions in file 371 to a SMS device, pager or PDA associated with the user. In addition, the user is afforded an option to receive the directions in installments via different delivery methods. Moreover, where the map server also provides graphics depicting the devised route and associated maps, made part of directions file 371, the directions server 145 may cause such graphics, as well as the directions, to be transmitted to the user via the different delivery methods.

In addition, in the disclosed embodiment, the route and directions are illustratively devised based on a given origination point and destination point. It will be appreciated that such route and directions may also be devised based on other requirements, e.g., any intermediate stops required by the user.

Moreover, in the disclosed embodiment, the user is provided with driving directions as the user illustratively travels by car. However, other directions may be provided depending on the actual mode of transportation, e.g., on foot or by train or air, which may be different from the driving directions. This stems from the fact that, for instance, a pedestrian may not be able to travel the same route as a driver which involves, e.g., a highway. In any event, the present invention advantageously applies to travel via any mode of transportation as the directions are received by use of a communication device which is not attached to any vehicle. Thus, with the invention, the user may utilize the same or different communication device(s) (e.g., a telephone, mobile phone, PDA, facsimile receiver, pager, SMS device, etc.) to obtain the appropriate directions while traveling, e.g., on foot or by car, train or air, or a combination thereof.

It is also well understood by those skilled in the art that various components of the system for implementing the invention can either be located in a single location, or be geographically distributed and in communication with one another through individual connections or a network.

Finally, information/call center 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A text-to-speech conversion method comprising:
   identifying a first phrase comprising one or more English-language words indicating a road and including at least a three digit number, in a text concerning directions;
   modifying the first phrase textually to become a second phrase, wherein if the middle digit is a zero, said middle digit is replaced with a word and if the middle digit is not a zero, at least one space being inserted before the middle digit; and converting the second phrase to a speech corresponding thereto to verbally convey the first phrase.

2. The method of claim 1 further comprising removing, from the text, selected elements making no phonetic contribution to the speech.

3. The method of claim 1, comprising:

modifying the first phrase by at least adding at least one element not present in the first phrase to the first phrase.

4. A text-to-speech conversion method comprising:

identifying, in a text, a first phrase comprising at least a number having three digits; modifying the first phrase textually to become a second phrase, wherein if the middle digit is a zero, said middle digit is replaced with a word and if the middle digit is not a zero, at least one space being inserted before the middle digit; and converting the second phrase to a speech corresponding thereto to verbally convey the first phrase.

5. A text-to-speech conversion method comprising:

identifying a first phrase comprising one or more English-language words indicating a road and including at least a three digit number, converting said first phrase to speech corresponding thereto to verbally convey the first phrase, wherein if the middle digit is a zero in said first phrase, said middle digit is replaced in said speech with a word, and if the middle digit in said first phrase is not a zero, the first digit is read separately from the middle and last digits.

* * * * *